US008159198B2

(12) United States Patent
Dishman et al.

(10) Patent No.: US 8,159,198 B2
(45) Date of Patent: Apr. 17, 2012

(54) POWER SUPPLY THAT ADJUSTS A TRANSFORMER TURNS RATIO TO OPERATE EFFICIENTLY AT HIGH AND LOW LINE INPUT

(75) Inventors: Cecil C. Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 12/260,039

(22) Filed: Oct. 28, 2008

(65) Prior Publication Data
US 2010/0102792 A1 Apr. 29, 2010

(51) Int. Cl.
G05F 1/14 (2006.01)
H02M 1/10 (2006.01)

(52) U.S. Cl. .................. 323/255; 323/301; 363/142

(58) Field of Classification Search .............. 323/247, 323/255–260, 340–347, 301, 302; 363/142, 363/143
See application file for complete search history.

(56) References Cited

U.S. PATENT DOCUMENTS

| 4,691,275 | A | | 9/1987 | Moscovici |
| 4,843,301 | A | | 6/1989 | Belanger |
| 5,103,388 | A | | 4/1992 | Williams et al. |
| 5,119,283 | A | | 6/1992 | Steigerwald et al. |
| 5,155,672 | A | * | 10/1992 | Brown ........................... 363/43 |
| 5,406,192 | A | | 4/1995 | Vinciarelli |
| 5,771,168 | A | | 6/1998 | Liao et al. |
| 5,831,846 | A | | 11/1998 | Jiang |
| 6,147,882 | A | | 11/2000 | Huber et al. |
| 6,407,936 | B1 | | 6/2002 | Tang |
| 6,639,369 | B2 | * | 10/2003 | Ribarich ....................... 315/307 |
| 6,770,984 | B2 | * | 8/2004 | Pai et al. ......................... 307/46 |
| 7,012,380 | B2 | * | 3/2006 | Price et al. ................ 315/209 R |
| 7,116,013 | B2 | * | 10/2006 | Pai et al. ......................... 307/64 |
| 2002/0044468 | A1 | | 4/2002 | Goodarzi et al. |
| 2008/0205103 | A1 | * | 8/2008 | Sutardja et al. ................. 363/84 |

FOREIGN PATENT DOCUMENTS
EP 0444792 A2 9/1991
EP 1198056 A2 4/2002

OTHER PUBLICATIONS
Efficient Wide Range Converters (EWiRaC): A new family of high efficient AC-DC Converters, Lars Petersesn et al. 2006 IEEE.

* cited by examiner

Primary Examiner — Jessica Han
(74) Attorney, Agent, or Firm — Kunzler Needham Massey & Thorpe

(57) ABSTRACT

An apparatus for efficient power supply operation variable input line voltages. The apparatus includes a detection module that senses the input line voltage to the power supply and determines whether it is high or low voltage. A turn module sets the turns ratio of the transformer to a first turns ratio if the input line voltage is low voltage. The turn module sets the turns ratio to a second turns ratio if the input line voltage is high. In one embodiment of the invention, a high voltage is between 180 and 250 volts, while a low voltage is between 90 and 130 volts. A primary module sets the boost voltage of the power supply's boost stage to a first voltage if the input line voltage is low, while it sets the boost voltage to a second voltage if the input line voltage is high. The first voltage may, for example, be 200 volts, and the second voltage 400 volts.

17 Claims, 6 Drawing Sheets

POWER SUPPLY THAT ADJUSTS A TRANSFORMER TURNS RATIO TO OPERATE EFFICIENTLY AT HIGH AND LOW LINE INPUT

BACKGROUND OF THE INVENTION

1. Field of the Invention

This invention relates to the field of power supplies, and particularly to power supplies that operate at both high line and low line input voltages.

2. Description of the Related Art

While many electrical devices operate using an input AC line voltage that is an alternating current (AC) input voltage of 120 Volts, it is often desirable to have the same devices operate over a wider range of input voltages. For example, high AC line voltages of around 220 Volts are also in common use. Currently, designers may simply build the power supply to withstand the rigors of the high AC line voltage, since it will also be able to handle the low AC line voltage. This power supply can then operate at both the high AC line voltage and the low AC line voltage.

Unfortunately, while the power supply designed to operate at high AC line voltage will also function with a low AC line voltage input, it will do so inefficiently. In many instances, the efficiency cost of using the same power supply with a low AC line voltage input can be as high as 5%. Where the electrical device is a high-usage device (for example, a server or a rack of servers) that is on for long, continuous periods, this 5% can quickly add up and impose significant costs on the operator.

Currently, designers solve the problem by designing two parallel power supplies—one optimized for high AC line voltage, and the other for low AC line voltage. Based on the input, the appropriate power supply system is used. While this solution allows for high efficiency at either voltage, it also imposes considerable additional cost since the user essentially needs to purchase two power supplies instead of one.

BRIEF SUMMARY OF THE INVENTION

The present invention has been developed in response to the present state of the art, and in particular, in response to the problems and needs in the art that have not yet been fully solved by currently available power reduction technologies. Accordingly, the present invention provides an apparatus, method, and system that allows a power supply to operate efficiently at variable input voltages.

The apparatus is provided with a logic unit containing a plurality of modules configured to functionally execute the necessary steps for efficiently operating a power supply at a variety of input line voltages. In one embodiment, the apparatus includes a detection module that senses the input line voltage supplied to the power supply and determines whether that input line voltage is high voltage or low voltage. In one embodiment, the low voltage includes voltages within the range of 90 and 130 volts and the high voltage includes voltages within the 180 to 250 volt range. The apparatus also includes a turn module.

The detection module may sense the input at the input to the power supply, or it may also sense the input voltage at the output of the power supply's internal input rectifier stage. The detection module may use the peak value of the input voltage, or may also use the root mean square (RMS) value of the input voltage where the input voltage is an AC signal.

The apparatus also includes a turn module that sets the turns ratio of the transformer that electrically connects the primary side of the power supply to the secondary side of the power supply. The turn module sets the turns ratio of the transformer to a first turns ratio when the detection module determines that the input line voltage is low voltage. The turn module sets the turns ratio of the transformer to the second turns ratio when the detection module determines that the input line voltage is the high voltage.

In one embodiment, setting the turns ratio of the transformer to the first turns ratio includes connecting a low-resistance path that bypasses one or more of the turns of the transformer. In one embodiment, setting the turns ratio of the transformer to the second turns ratio includes disconnecting the low-resistance path.

In another embodiment, setting the turns ratio of the transformer to the first turns ratio comprises setting a tap on the transformer to a first tap, and setting the turns ratio of the transformer to the second turns ratio includes connecting to a second tap. In such an embodiment, the transformer may be a multi-tap transformer.

The apparatus, in one embodiment, also includes a primary module that sets the boost voltage of the boost stage of the power supply to a first voltage if the detection module determines that the input line voltage is the low voltage. The primary module also sets the boost voltage to a second voltage if the detection module determines that the input line voltage is the high voltage. In such an embodiment, the power supply receiving the low voltage operates more efficiently with the boost stage output voltage set to the first voltage than if it were receiving the low voltage with the boost stage output set to the second voltage. The first voltage is determined by a power supply designer to increase efficiency of the power supply when it is receiving the low voltage while ensuring that the power supply also meets other design parameters. Similarly, the second voltage is given a value that increases the efficiency of the power supply when it is receiving the high voltage.

In one embodiment, the boost stage of the power supply provides active power factor correction for the power supply. In a further embodiment, the transformer is a component of a buck-derived stage of the power supply that connects the primary side of the power supply to the secondary side.

The application also discloses a system for efficient power supply operation at variable input line voltages. The system, in one embodiment, includes the detection module, turn module, and primary module described above. The system may also include a power supply that receives an input voltage from a power source and that provides a regulated output voltage that is either high voltage or low voltage. The system may also include an electronic load, such as a computer, blade system, or appliance, that connects to the power supply and receives as input the regulated output voltage of the power supply. The input voltage can be either AC or DC, and the regulated output voltage can similarly be either AC or DC.

Also disclosed is a method for efficient power supply operation at variable input line voltages. The method includes sensing the input line voltage to a power supply, determining whether it is a high voltage or a low voltage, setting the turns ratio of the transformer to the first turns ratio in response to determining that the input line voltage is the low voltage, and setting the turns ratio of the transformer to the second turns ratio in response to determining that the input line voltage is the high voltage.

The method may also include setting the boost voltage of the boost stage to the first voltage in response to determining that the input line voltage is the low voltage, and setting the boost voltage of the boost stage to the second voltage in response to determining that the input line voltage is the high voltage. In one embodiment, the first turns ratio provides optimal energy transfer by the transformer from the primary side to the secondary side when the boost voltage is set to the first voltage, and the second turns ratio provides optimal energy transfer by the transformer from the primary side the secondary side when the boost voltage is set to the second voltage.

In one embodiment, more voltages beyond the high and low voltage are possible, and the detection module determines whether the input voltage is some third voltage.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Where the modules are implemented in software, they are generally stored in computer readable media and are executable by a processor.

Indeed, a module of executable code could be a single instruction, or many instructions, and may even be distributed over several different code segments, among different programs, and across several memory devices. Similarly, operational data may be identified and illustrated herein within modules, and maybe embodied in any suitable form and organized within any suitable type of data structure. The operational data may be collected as a single data set, or may be distributed over different locations including over different storage devices, and may exist, at least partially, merely as electronic signals on a system or network.

Figure 1:
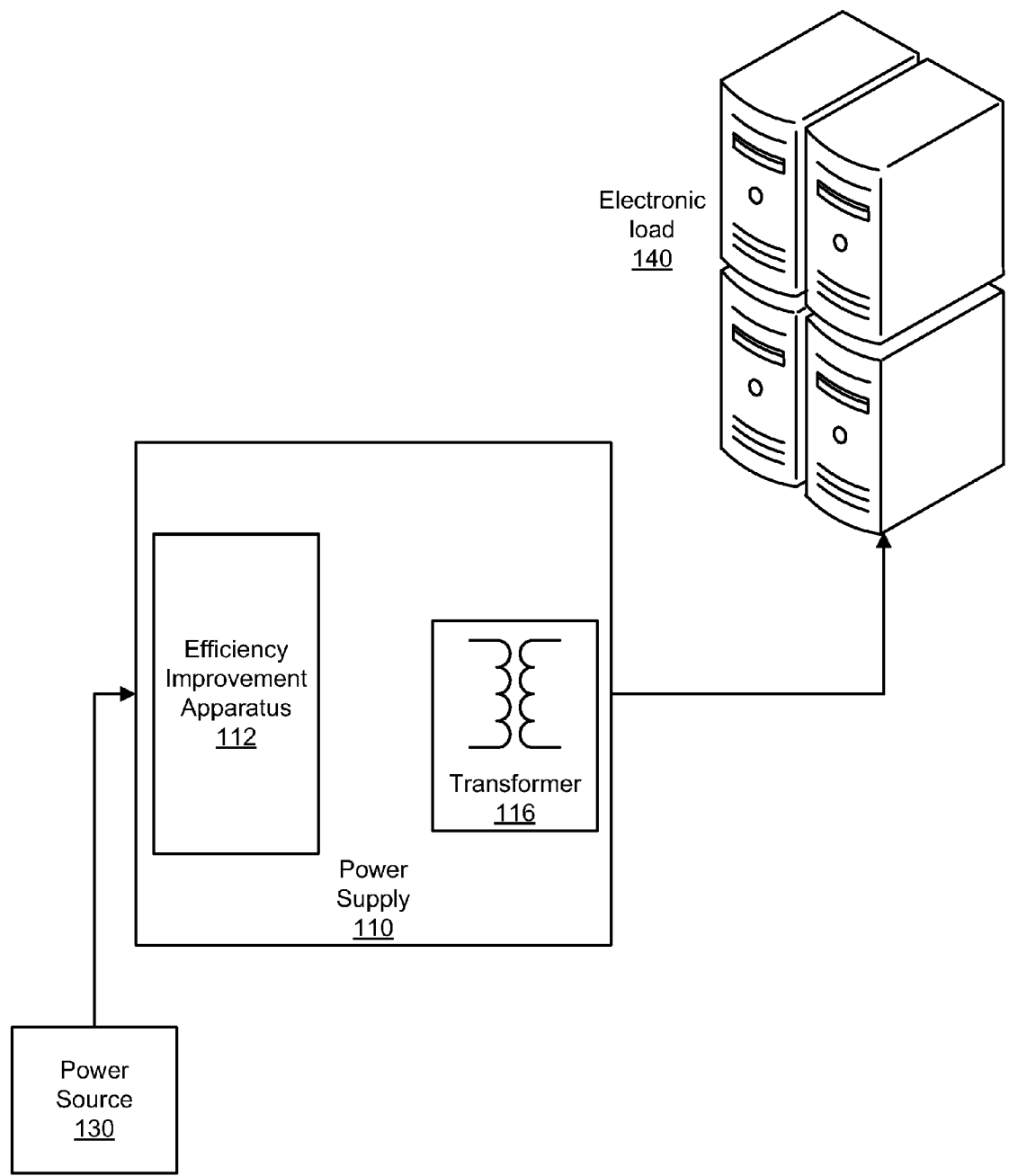
FIG. 1 is a schematic block diagram illustrating one embodiment of a power supply system in accordance with the present invention.

FIG. 1 depicts a system for efficient power supply operation at variable input line voltages. The system includes a power source 130, a power supply 110, and an electronic load 140. The power source 130 provides regulated input power to the power supply 110, which in turn transforms the power received into a regulated output voltage that it in turn provides to the electronic load 140. The power source 130 may be any known power supply in the art that provides regulated voltage at its output. In one embodiment, the power source 130 may provide a DC output, while in other embodiments it provides a regulated AC output.

The power source 130 may, for example, be a standard wall socket found in many buildings in the United States that provides a regulated 120 Volt AC output voltage. The power source 130 may also provide three-phase power such as 115/200V, 120/208V, 277/480V or 347/600V. In accordance with the present invention, the power supply 130 can supply one or both of a high voltage or a low voltage.

Also shown is the power supply 100 which receives as input the regulated output voltage of the power source 130 and provides as output a regulated output voltage for the electronic load 140. The power supply 110 includes an efficiency improvement apparatus 112 for efficient power supply operation and a transformer 116. In one embodiment, and as described in greater detail below, the transformer 116 electrically connects the primary side of the power supply 110 with the secondary side of the power supply 110. The power supply 110 is a switching power supply that makes use of active circuit components such as switches and pulse width modulators to efficiently provide a regulated output voltage for the electronic load 140.

The power supply 110 is generally composed of multiple stages with various topologies such as boosts, bucks, buck-boosts, flybacks, Ćuks, combinations thereof, and other known topologies that make use of switches. Those in the art will appreciate that such multi-stage supplies can be used to provide active power factor correction by controlling the input current of the load so that it is proportional to the input voltage. In this manner, active power factor correction can provide a power factor close to unity, thus reducing energy losses and harmonics in the system. Power supply stages using active circuit components can also be configured to provide a tightly regulated output voltage for the power supply 110 in spite of changes to the load.

The efficiency improvement apparatus 112 allows the power supply 110 to operate efficiently regardless of whether the power source 130 provides a high voltage or low voltage. The efficiency improvement apparatus 112 senses the input line voltage to the power supply 110 and determines whether it is a high voltage or a low voltage. If the input line voltage is low voltage, the efficiency improvement apparatus 112 adjusts the number of turns on the transformer 116 such that it provides optimal efficiency within the design parameters of the power supply 110. Similarly, if the input line voltage is high voltage, the efficiency improvement apparatus 112 adjusts the number of turns on the transformer 116 such that it provides optimal efficiency at high voltage while meeting the other requirements for the power supply 110.

Regardless of whether the input voltage is high voltage or low voltage, the power supply 110 provides a regulated output voltage for the electronic load 140. This regulated output voltage may be either direct current (DC) or alternating current (AC). In typical embodiments, the output voltage is DC, unless the DC converter feeds an inverter stage of the power supply 110. The electronic load 140 is a device that receives power from the power supply 110. The electronic load 140 expects a regulated output voltage within predefined parameters in order to function properly. The electronic load 140 may also receive a set of different regulated outputs from the power supply 110; for example, a power supply 110 in a computing system may provide voltages of 12V, 5V, 3.3V, and −12V.

The electronic load 140 maybe a stand-alone computer. The electronic load 140 may also be a server or a set or servers in a rack. The electronic load 140 can also be a blade server where the power supply 110 supplies some or all of the blades in the system. The electronic load 140 may also be an appliance such as a washer, dryer, or television. While the power supply 110 is shown as separate from the electronic load 140, those of skill in the art will appreciate that the power supply 110 may be physically incorporated into the electronic load 140 or may stand alone.

As a result of the efficiency improvement apparatus 112, the power supply 110 in the system can provide efficient transfer of power from the power source 130 to the electronic load 140 regardless of whether the power source 130 supplies a high voltage or a low voltage. Further, the efficiency improvement apparatus 112 allows this to be done with a single power supply 110, which significantly reduces the costs and complications associated with the system.

Figure 2:
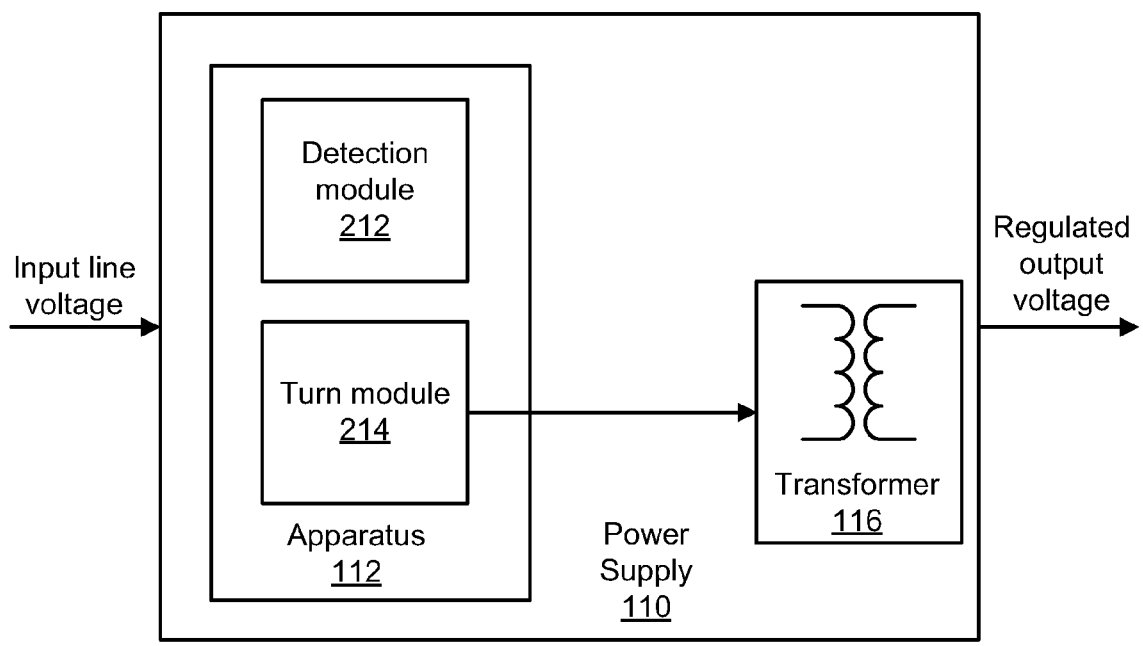
FIG. 2 is a schematic block diagram showing an embodiment of a power supply in accordance with the present invention.

FIG. 2 shows an alternative embodiment of the power supply 110 with the efficiency improvement apparatus 112. The efficiency improvement apparatus 112, in the depicted embodiment, includes a detection module 212 and a turn module 214. The efficiency improvement apparatus 112 may be implemented in strictly in hardware; in an alternative embodiment, the efficiency improvement apparatus 112 is implemented in a microprocessor and provided with sensors necessary to perform the functionality described below.

The detection module 212 senses the input line voltage from the power source 130 and determines whether the input line voltage is a high voltage or a low voltage. The range of values that qualify as a high voltage, and those that qualify as a low voltage, are generally predetermined and provided by the designer of the power supply 110. Typically, the term "high voltage" refers to a voltage between 180 and 250 volts. The term "low voltage" typically refers to a voltage between 90 and 130 volts. In other embodiments, the low voltage may be approximately 277 volts and the high voltage approximately 480 volts in a 277/480 V system, such as those commonly used in larger buildings for mechanical equipment and lighting. Similarly, other countries use different voltage levels and frequencies than those used in the United States, and the ranges for the high voltage and the low voltage may be adjusted accordingly. In common with these systems, however, is that the range defined by the high voltage is higher than that defined by the low voltage.

The detection module 212 may also determine whether the input line voltage is some third voltage predefined by the power supply designer. Depending on the efficiency objectives for the power supply 110 and the variability of possible input line voltages from the power source 130, the detection module 212 may detect any number of voltages and adjust the operations of the power supply 110 as described below.

The apparatus 112 also includes a turn module 214. The turn module 214 sets the turns ratio of the transformer 116 to a first turns ratio when the detection module 212 determines that the input line voltage is the low voltage. The turn module 214 also sets the turns ratio of the transformer 116 to a second turns ratio when the detection module 212 determines that the input line voltage is the high voltage. The turn module 214 may also set the turns ratio of the transformer 116 to a third turns ratio if the detection module 212 determines that the input line voltage is a predefined third voltage.

In one embodiment, the turn module 214 sets the turns ratio of the transformer 116 by connecting a low-resistance path that bypasses some of the turns of the transformer 116. For example, the turn module 214 may connect a relay to the primary side of the transformer that effectively shorts the remaining turns on the primary side. This short circuit effectively removes the bypassed turns of the transformer 116 from the electrical circuit. If the power supply 110 is only designed to respond to the high voltage and low voltage designations, the power supply 110 may have a transformer 116 that, unaltered, is designed to operate efficiently at the high voltage. Thus, the turn module 214 connects the relay to short the turns of the transformer 116 when the input line voltage switches to a low voltage and disconnects the relay if the input line voltage switches back to high voltage.

In one embodiment, the transformer 116 maybe a multi-tap transformer. The turns ratio of the transformer 116 can then be altered by connecting to various combinations of taps provided by the transformer 116. In such an embodiment, the turn module 214 may set the turns ratio of the transformer 116 to the first turns ratio by setting the tap to a first tap. The turn module 214 can similarly set the turns ratio to the second turns ratio by setting the tap to a second tap of the transformer 116.

As a result, the power supply 110 may receive a variety of input line voltages within predefined ranges. The apparatus 112, using the detection module 212 and turn module 214, determines the appropriate turns ratio for the particular input line voltage and adjusts the actual turns ratio of the transformer 116 accordingly. The power supply 110 thus maintains efficient operation across a wide range of input line voltages while still providing a regulated output voltage at its output terminals.

Figure 3:
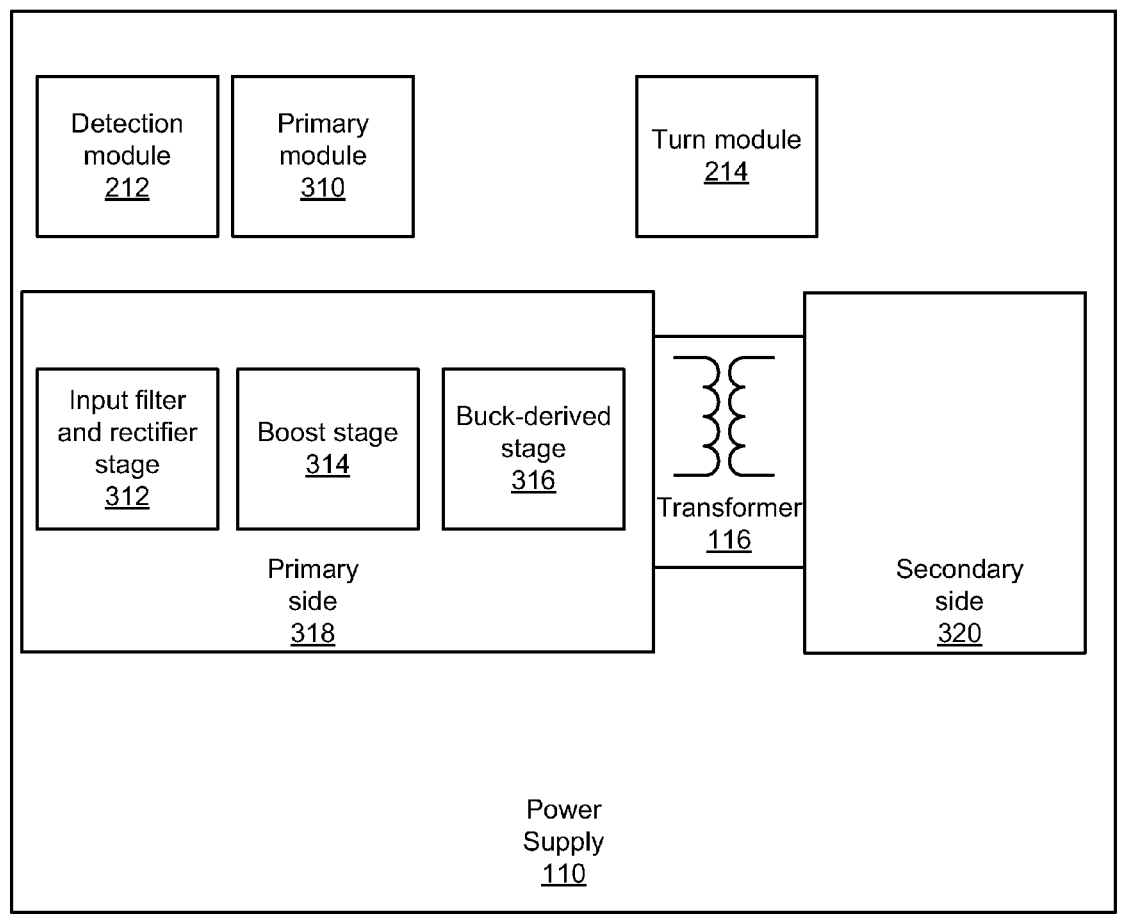
FIG. 3 is a schematic block diagram showing an additional embodiment of a power supply in accordance with the present invention.

FIG. 3 shows a third embodiment of the power supply 110. The power supply 110 includes a detection module 212, a turn module 214, and a transformer 116 which are substantially similar to those discussed above. The power supply 110 also includes a primary module 310 described below. The transformer 116 connects the primary side 318 of the power supply 110 with the secondary side 320. The primary side 318, in the depicted embodiment, includes an input filter and rectifier stage 312, a boost stage 314, and a buck-derived stage 316.

The input filter and rectifier stage 312 converts the AC input line voltage into DC through rectification. The input filter and rectifier stage 312 also filters certain frequencies and limits occurrences of electromagnetic interference ("EMI"). In typical embodiments, the input filter and rectifier stage 312 is the first stage through which the AC input line voltage is passed.

The primary side 318 also includes a boost stage 314. The boost stage 314 provides regulation for the power supply 110 and typically provides an output voltage that is higher than the DC voltage at its input to another stage of the power supply 110 for additional processing. In one embodiment, the boost stage 314 provides active power factor correction for the power supply 110. A power factor approximately equal to one is highly desirable, and in many cases, required by regulations. The boost stage 314 draws a current from a source approximately in phase with the input voltage to the boost stage 314, providing a power factor approximately equal to 1, which furthers the power savings and efficiency of the power supply. Those of skill in the art will appreciate that the boost stage 314 may be implemented as a boost- or buck-derived topology known to those in the art.

Those of skill in the art will appreciate that the primary side 318 may also include one or more additional stages in addition to those shown in FIG. 3. For example, the primary side 318 may also include a phase-shift full-bridge such as that shown in FIG. 4. Additional switching stages may be used to provide rectification, voltage or current conversion, frequency changing, inversion, etc. In one embodiment, the primary side 318 includes a buck-derived stage 316. The buck-derived stage may be, for example, a phase-shift full-bridge that includes the transformer 116. The buck-derived stage 316, in such an embodiment, connects the primary side 318 and the secondary side 320 of the power supply 110 through the transformer 116.

In one embodiment, the detection module 212 senses the input line voltage at the input of the power supply; that is, it senses the input line voltage before it is fed into the input filter and rectifier stage 312 of the power supply 110. In an alternative embodiment, the detection module senses the input line voltage at the output of the input filter and rectifier stage 312. The input line voltage may be sensed at a variety of locations within the power supply 110 and the detection module 212 is not restricted to any particular stage or location.

The detection module 212 may also be configured to determine the peak voltage of the input line voltage and base its determinations of whether or not the input high voltage is the high voltage or low voltage using relevant peak values. The detection module 212 may alternatively determine the root-mean-square ("RMS") value of the input line voltage and use those values in place of the peak values.

The power supply 110 may also include a primary module 310. The primary module 310 sets the boost voltage of the boost stage 314 to a first voltage when the detection module 212 determines that the input line voltage is the low voltage. For example, where the low voltage is approximately 115 Volts, the primary module 310 sets the boost voltage to 200 Volts. The primary module 310 sets the boost voltage of the boost stage 314 to a second voltage if the detection module 212 determines that the input line voltage is the high voltage. When the high voltage is approximately 220 Volts, the primary module 310 sets the boost voltage to 400 Volts.

Thus, in one embodiment, the power supply 110 is optimized for operation when the input line voltage is a high voltage of approximately 220 Volts. In such an embodiment, the boost voltage is set to 400 Volts and the transformer 116 is left unshorted. If the input line voltage changes to a low voltage of approximately 115 Volts, the difference between the input line voltage and the boost voltage of 400 Volts is about 285 Volts. This large difference has a negative impact of the efficiency of the power supply 110 at the low voltage. In accordance with the present invention, the power supply 110 adjusts the boost voltage to a more efficient boost voltage and also adjusts the turns ratio of the transformer 116 to facilitate operation at the lower boost voltage.

As a result, the power supply 110 operating with a low voltage input line voltage operates more efficiently with the boost voltage set to the first voltage than it would if the boost voltage were set to the second voltage. The power supply designer determines an appropriate value for the boost voltage in both high and low voltage operation. The power supply designer chooses values that optimize the efficiency of the power supply 110 while ensuring that the power supply 110 also meets other design parameters of the power supply. For example, setting the boost voltage as equal to the low voltage in the low voltage input condition, with a duty cycle of zero, would be highly efficient, but the boost stage 314 would not effectively provide active power factor correction. Thus, the first voltage is set to maximize efficiency when the power supply is receiving a low voltage, and the second voltage is set such that the efficiency of the power supply is increased when the power supply is receiving a high voltage.

Figure 4:
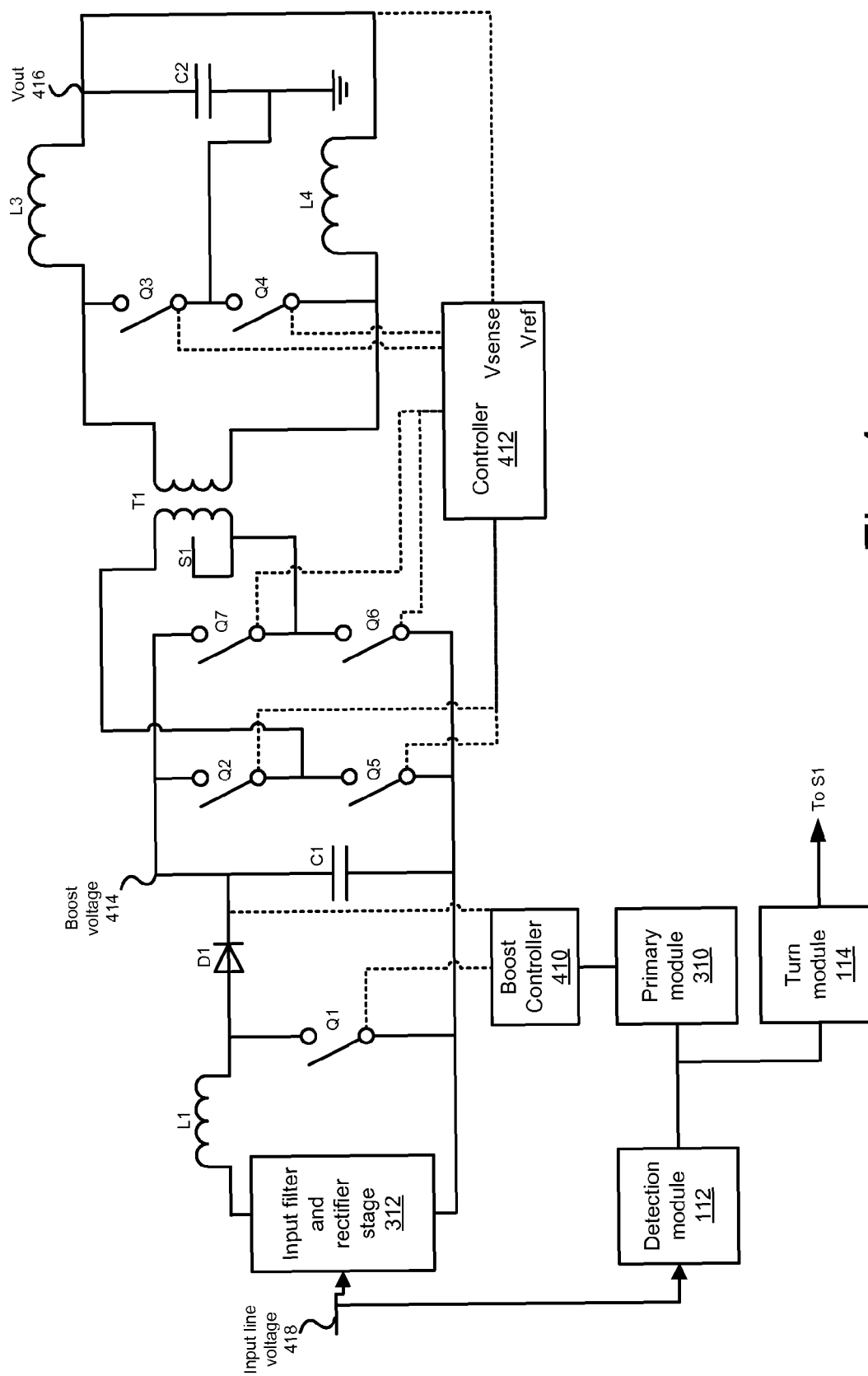
FIG. 4 is a schematic block diagram showing an additional view of a power supply circuit that can be used to implement an embodiment of the present invention.

FIG. 4 shows one embodiment of an implementation of a power supply 110 including an apparatus for efficient power supply operation in accordance with the present invention. As described above, an input filter and rectifier stage 312 receives an input line voltage 418 and converts it to a DC voltage. In the depicted embodiment, the detection module 112 senses the input line voltage 418 prior to it being fed into the input filter and rectifier stage 312. The detection module 112 determines whether the input line voltage is the predefined high voltage or low voltage.

FIG. 4 also shows a boost stage made up of the inductor L1, the switch Q1, the diode D1, and the capacitor C1. The boost stage provides a regulated output voltage identified as the boost voltage 414. The boost voltage 414 is higher than the DC voltage at the input to the boost stage. In the depicted embodiment, the boost voltage 414 is the input to an additional stage of the power supply. As discussed above, the boost stage may provide active power factor correction for the power supply and allow it to operate more efficiently.

The boost controller 410 controls the switch Q1 and regulates the boost voltage 414 that appears across the capacitor C1. The boost controller 410 switches Q1 on and off for a particular duty cycle such that the boost voltage 414 is maintained at or near a predefined reference voltage. Q1 may be a metal-oxide-semiconductor field-effect transistor ("MOSFET"), a bipolar junction transistor ("BJT"), power MOSFET, or other switch known to those of skill in the art.

The boost controller 410 senses the boost voltage 414 and uses a feedback loop to adjust the duty cycle such that the boost voltage 414 is kept at or near the predefined voltage for the boost stage. For example, boost controller 410 may control the duty cycle to ensure that the boost voltage 414 is kept at approximately 400 Volts. Of course, some steady-state deviation is acceptable as well as variations caused by transients.

FIG. 4 also depicts an output stage coupled with the previously described boost stage. The depicted output stage includes a phase-shift full-bridge topology with a controller 412 for regulating the output voltage Vout 416. The output stage controller 412 regulates the output voltage Vout 416 by switching on and off the various switches Q2-Q7 at particular timing intervals and with a particular duty cycle.

The phase-shift full-bridge includes four switches (Q2, Q5, Q6, and Q7) arranged as a full-bridge rectifier. The rectifier circuit includes switch Q2 and switch Q5 in series between a power source (or output of an input stage, i.e. across capacitor C1) and ground, and switch Q7 and switch Q6 in series between the output of the regulation stage and ground. The transformer T1 is coupled to a node between the switch Q2 and the switch Q5, and is also coupled to a node between switch Q7 and switch Q6. These switches are controlled by the controller 412 to pass energy through the transform T1 to the rest of the circuitry in the output stage.

For example, the switches Q2, Q5, Q6, and Q7 maybe alternatively turned off and on in various patterns and configurations to cause a current to flow through the input side of the transformer T1 in one direction and then in the opposite direction. In one embodiment, the switches Q2 and Q6 may be turned on and the switches Q5 and Q7 may be turned off thereby causing a current path to be created such that the current travels through the switch Q2 to the top input node of the transformer T1, through the transformer T1, and back through the switch Q6. Conversely, if the switches Q2 and Q6 are turned off, and the switches Q5 and Q7 are turned on, then current will flow through the transformer T1 in the opposite direction.

In one embodiment, a power supply designer can implement zero voltage switching by timing the switching for Q2 and Q6 and for Q5 and Q7, and by utilizing the parasitic capacitance of the switches. Operating with zero voltage switching can increase the overall efficiency of the power supply.

Once the energy is passed through the transformer T1, the output stage controller 402 controls one or more additional switches Q3 and Q4 to pass current through inductors L3 and L4 in order to maintain a voltage Vout across the capacitor C2. Again, as will be recognized by those of skill in the art, numerous additional topologies may be implemented in the output stage including, in particular, boost-type and buck-type topologies. Additionally, numerous other configurations of the described modules may be possible. For example, the modules depicted within the power supply may, in some embodiments, be implemented outside the power supply or may be implemented in other configuration not depicted as will be recognized by one of skill in the art.

In accordance with the present invention, the power supply includes a primary module 310. The primary module 310 communicates with the detection module 112 and, as described above, adjusts the boost voltage 414 to a first voltage when the input line voltage is low, and a second distinct voltage when the input line voltage is high. In one embodiment, the primary module 310 adjusts the reference voltage provided to the boost controller 410 to control the boost voltage 414. For example, when the input line voltage 418 is a high voltage having a value of about 220 Volts, the primary module 310 adjusts the reference voltage of the boost controller 410 to 400 Volts. The boost controller 410 then adjusts the duty cycle to set the boost voltage 414 across the capacitor C1 to 400 Volts. In contrast, when the input line voltage 418 is a low voltage of approximately 115 Volts, the primary module 310 uses the boost controller 410 to adjust the boost voltage 414 to 200 Volts.

In one embodiment, the transformer T1 provides optimal energy transfer to the secondary side when the boost voltage 414 is set to 400 Volts. In such an embodiment, when the detection module 112 indicates that the voltage is high, the turn module 114 does not short any of the turns of the transformer T1. Thus, the turn module 114 has set the turns ratio of the transformer T1 to an optimal turns ratio for the particular input line voltage 418 and associated boost voltage 414.

If the input line voltage 418 is a low voltage of about 115 Volts, the primary module 310 sets the boost voltage 414 to a first voltage, which in one embodiment is 200 Volts. In addition, the turn module 114 sets the turns ratio of the transformer T1 to a first turns ratio that optimizes the transfer of energy to the secondary side given the particular input line voltage 418 and boost voltage 414. In the depicted embodiment, a relay S1 is connected to the transformer T1. When the input line voltage 418 is the low voltage, the turn module 114 sends a signal to close the relay S1, which effectively shorts out some of the turns on the transformer T1 (i.e., provides a low-resistance path that bypasses turns of the transformer T1). Thus, the turns ratio of the transformer T1 is altered to facilitate effective operation of the transformer T1 with the boost voltage set to 200 Volts.

As discussed above, the transformer T1 may be a multi-tap transformer. In such an embodiment, the turn module 114 can connect and disconnect contacts to the various taps of the transformer. For example, there maybe relays for each transformer tap. The turn module 114 can then open and close the various relays to adjust the turns ratio of the transformer T1.

The primary module 310, detection module 112, and turn module 114 allow the power supply to operate more efficiently when the boost voltage 414 is set to the first voltage and the input line voltage 418 is low than it would with the boost voltage 414 set to the second voltage. Thus, the power supply can efficiently condition power received as the input line voltage 418 and provide a regulated Vout 416 even with variations between high and low voltage at the input. A single power supply can meet a wide range of demands efficiently and without the cost of replicating the power supply circuitry.

Those of skill in the art will appreciate how to calculate an appropriate turns ratio of the transformer T1 given a particular boost voltage 414. In addition, the present invention is not limited to any number of acceptable voltage ranges; for example, a designer may define a range of voltages, each of which has an associated boost voltage 414 and turns ratio. While the description above uses a high voltage and a low voltage as an example, the present invention is not limited to only two defined ranges.

Naturally, the power supply designer will have other design parameters which must be met and taken into consideration when determining appropriate boost voltages 414 for the various input line voltage 418 values. For example, while having a boost voltage 414 that is set equal to the input line voltage 418 with no switching of Q1 might be very efficient, it would also mean that the boost stage did not provide any active power factor correction. Thus, the power supply designer makes selections in values based on the overall objectives for the particular stage and implementation of the power supply.

Figure 5:
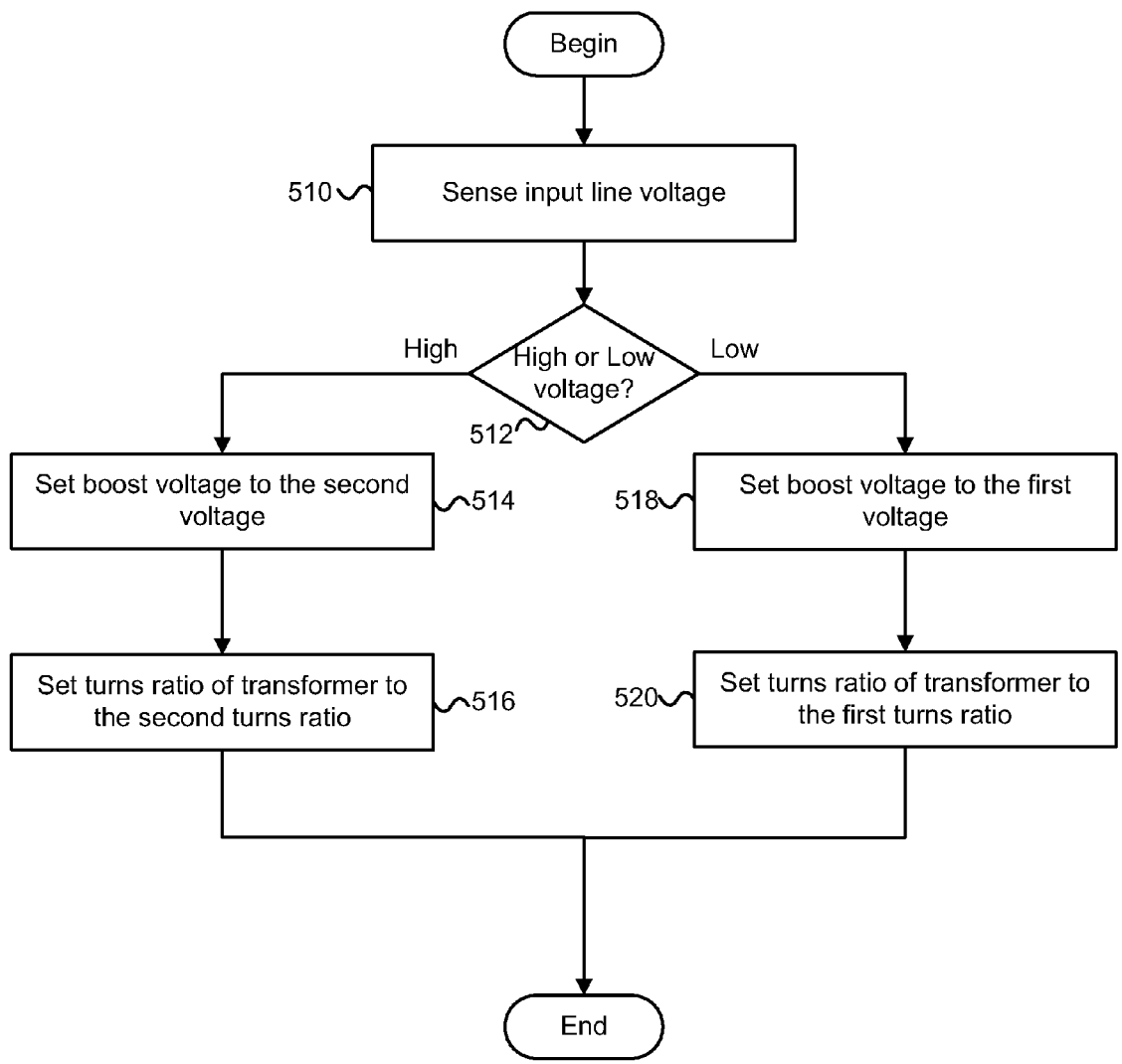
FIG. 5 is a schematic flow chart diagram illustrating a method for efficient power supply operation at variable input line voltages.
Figure 6:
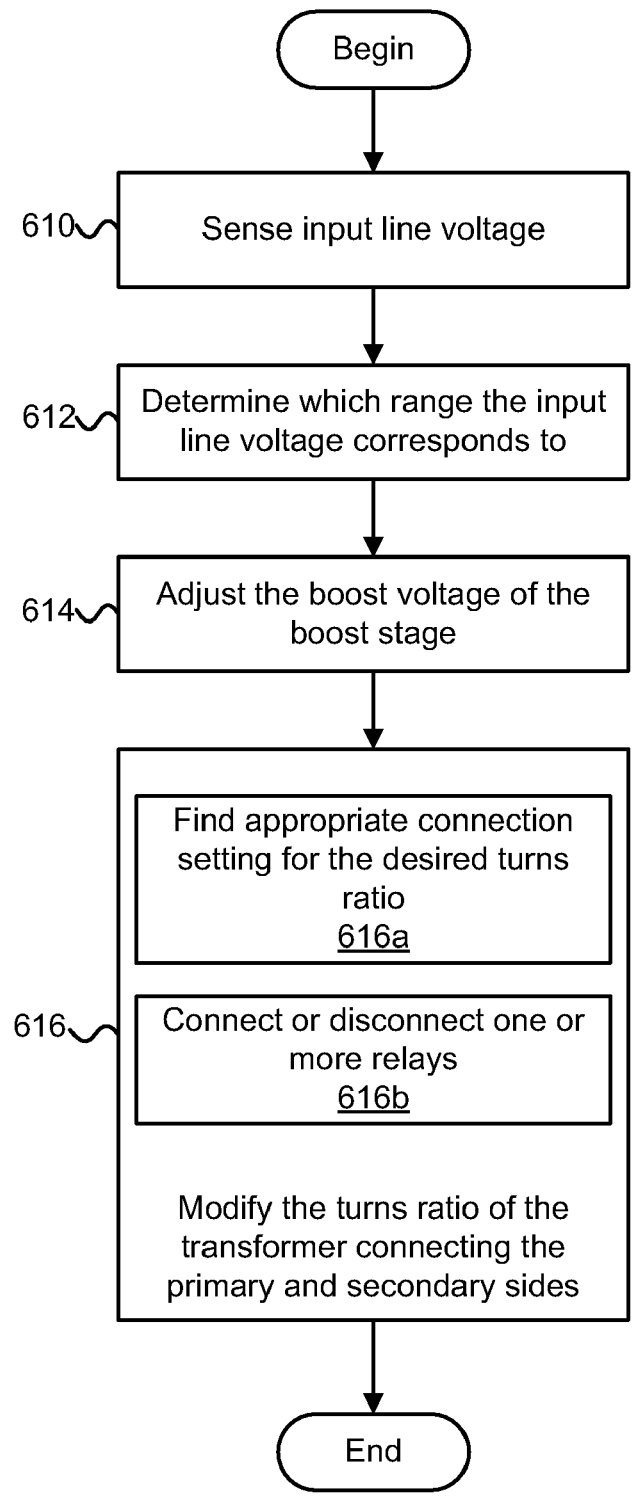
FIG. 6 is a second schematic flow chart diagram illustrating a method for efficient power supply operation at variable input line voltages.

FIGS. 5 and 6 show a flow chart diagram illustrating a method for efficient power supply operation in accordance with the present invention. Those of skill in the art will appreciate that the flow chart is exemplary of a method, and that the present invention is not limited to the particular steps described, nor to any particular order implied by the Figures. To the contrary, methods for efficient power supply operation at variable input line voltages may include one or more steps and may perform the steps in a different order than that depicted in FIGS. 5 and 6.

The method begins with the detection module 212 sensing 510 the input line voltage fed to the power supply. As discussed above, the input line voltage may be sensed at various stages or locations in the power supply. The detection module 212 also determines 512 whether the input line voltage is within the range that defines the high voltage or that which defines the low voltage.

If the detection module 212 determines that the input line voltage is the high voltage, the primary module 310 sets 514 the boost voltage to the second voltage. As discussed above, in one embodiment, the primary module 310 adjusts the predefined reference voltage fed to the boost controller of the boost stage a new predefined reference voltage to bring the boost voltage to the second voltage. The primary module 310, however, is not limited to this particular method of adjusting the boost voltage.

With the boost voltage appropriately adjusted, the turn module 214 sets 516 the turns ratio of the transformer that connects the primary side to the secondary side to a second turns ratio. In one embodiment, the second turns ratio is one which maximizes efficient power transfer to the secondary side with the boost voltage set to the second voltage. Setting the turns ratio may involve connecting a low-resistance path that bypasses one or more turns of the transformer. Setting the turns ratio may also involve disconnecting the low-resistance path. Other ways to adjust the turns ratio are described above and are known to those in the art.

If the detection module 212 determines 512 that the input line voltage is the low voltage, the primary module 310 sets 514 the boost voltage to the first voltage. For example, when the input line voltage is 120 Volts and that is defined as falling with the range of a low voltage, the primary module 310 may set the boost voltage to 200 Volts. The turn module 214 then sets 520 the turns ratio of the transformer to a first turns ratio. As above, in one embodiment, the first turns ratio is one that maximizes efficient power transfer to the secondary side with the boost voltage set to the first voltage. With the boost voltage and turns ratio appropriately set, the power supply is operating in a most efficient mode for the particular input line voltage and the method ends.

FIG. 6 presents an additional embodiment of a method for efficient power supply operation. The method begins with sensing 610 the input line voltage. In one embodiment, the detection module 212 described above performs the sensing operation. The method also includes determining 612 the input line voltage (whether peak or RMS) and determining the range of values to which the particular input line voltage corresponds to. In one embodiment, there are two ranges of values that define a high voltage and a low voltage. In alternative embodiments, more than two ranges are provided. In one embodiment, the detection module 212 performs the determination functionality described above.

The method also includes adjusting 614 the boost voltage of the boost stage. For example, the boost voltage may be set to a first voltage when the input line voltage is low, or a second voltage when the input line voltage is high. In one embodiment, the primary module 310 disclosed above adjusts the boost voltage.

The method also involves modifying 616 the turns ratio of the transformer connecting the primary side and secondary side of the power supply. Modification of the turns ratio may be done, for example, by the turns module. In one embodiment, the modification step includes finding 616a an appropriate connection setting for the desired turns ratio. For example, multiple relays making multiple connections to the transformer maybe used to provide multiple turns ratios. In such an embodiment, the turns module may use a look up table to find a particular relay configuration profile associated with the relevant input line voltage.

The step 616 also includes connecting or disconnecting 616b one or more relays. The turns module may perform this step and connect and disconnect relays in accordance with the particular relay configuration profile. As a result of the connections and disconnections, the turns ratio of the transformer is altered and set to optimize performance for the particular input line voltage and associated boost voltage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficient power supply operation at variable input line voltages, the apparatus comprising:
   a detection module that senses an input line voltage to a power supply and determines whether the input line voltage is a high voltage or a low voltage;
   a primary module that sets a boost voltage of a boost stage of the power supply to a first voltage in response to the detection module determining that an input line voltage is a low voltage and that sets the boost voltage to a second voltage in response to the detection module determining that the input line voltage is a high voltage, the second voltage higher than the first voltage, the boost stage comprising a direct current ("DC") to DC switching power supply wherein the input line voltage provides input power to the boost stage and the boost voltage comprises a regulated output voltage of the boost stage;
   a turn module that:
      sets a turns ratio of a transformer to a first turns ratio in response to the detection module determining that the input line voltage is the low voltage, wherein the transformer electrically connects a primary side of a buck-derived stage of the power supply to a secondary side of the power supply, wherein the transformer is a component of the buck-derived stage of the power supply, the buck-derived stage connecting the primary side of the power supply to the secondary side of the power supply, the boost voltage comprising an input voltage to the buck-derived stage, an output of the buck-derived stage comprising an output voltage of the power supply, the output voltage comprising a DC voltage regulated to a voltage lower than the boost voltage; and
      sets the turns ratio of the transformer to a second turns ratio in response to the detection module determining that the input line voltage is the high voltage.

2. The apparatus of claim 1, wherein the power supply receiving the low voltage operates more efficiently with the boost stage output voltage set to the first voltage than the power supply receiving the low voltage with the boost stage output set to the second voltage.

3. The apparatus of claim 2, wherein the first voltage is determined by a power supply designer to increase efficiency of the power supply when receiving the low voltage and that also meets one or more design parameters of the power supply.

4. The apparatus of claim 2, wherein the second voltage is given a value to increase efficiency of the power supply when receiving the high voltage.

5. The apparatus of claim 1, wherein the boost stage provides active power factor correction for the power supply.

6. The apparatus of claim 1, wherein setting the turns ratio of the transformer to the first turns ratio comprises connecting a low-resistance path that bypasses one or more turns of the transformer and wherein setting the turns ratio of the transformer to a second turns ratio comprises disconnecting the low-resistance path.

7. The apparatus of claim 1, wherein setting the turns ratio of the transformer to the first turns ratio comprises setting a tap on the transformer to a first tap and wherein setting the turns ratio of the transformer to a second turns ratio comprises connecting to a second tap, wherein the transformer is a multi-tap transformer.

8. The apparatus of claim 1, wherein the high voltage is between 180 and 250 volts, and the low voltage is between 90 and 130 volts.

9. The apparatus of claim 1, wherein the detection module determines whether the input voltage is a third voltage, and wherein the turn module sets the turns ratio of the transformer to a third turns ratio in response to the detection module determining that the input line voltage is the third voltage.

10. The apparatus of claim 1, wherein the detection module senses the input voltage at one of an input to the power supply and an output of an input rectifier stage of the power supply.

11. The apparatus of claim 1, wherein the detection module determines one of a peak and a root mean square (RMS) value of the input voltage, wherein the input voltage is an alternating current input voltage.

12. The apparatus of claim 1, wherein the output voltage of the buck-derives stage is regulated to a voltage lower than the boost voltage.

13. A system for efficient power supply operation at variable input line voltages, the system comprising:
   a power supply that receives an input voltage from a power source and provides a regulated direct current ("DC") output voltage, wherein the input voltage is one of a high voltage and a low voltage, the power supply comprising a boost stage and a buck-derived stage, the input line voltage providing input power to the boost stage, the boost stage comprising a DC to DC switching power supply, the buck-derived stage comprising a transformer, an output of the boost stage comprising a boost voltage that is an output voltage of the boost stage, the boost voltage comprising an input voltage to the buck-derived stage, the output of the buck-derived stage comprising the regulated output voltage of the power supply, the output voltage regulated to a voltage lower than the boost voltage;
   a detection module that senses an input line voltage to the power supply and determines whether the input line voltage is a high voltage or a low voltage; and
   a primary module that sets the boost voltage to a first voltage in response to the detection module determining that an input line voltage is a low voltage and that sets the boost voltage to a second voltage in response to the detection module determining that the input line voltage is a high voltage, the second voltage higher than the first voltage;
   a turn module that:
      sets a turns ratio of a transformer to a first turns ratio in response to the detection module determining that the input line voltage is the low voltage, wherein the transformer electrically connects a primary side of the power supply to a secondary side of the power supply; and
      sets the turns ratio of the transformer to a second turns ratio in response to the detection module determining that the input line voltage is the high voltage.

14. The system of claim 13, further comprising an electronic load that connects to the power supply and receives as input a regulated output voltage of the power supply, and wherein the electronic load is one of a computer, a blade system, and an appliance.

15. The system of claim 13, wherein the input voltage is one of an alternating current and a direct current.

16. A method for efficient power supply operation at variable input line voltages, the method comprising:
   sensing an input line voltage to a power supply;
   determining whether the input line voltage is a high voltage or a low voltage;
   setting a boost voltage of a boost stage of a power supply to a first voltage in response to the detection module determining that an input line voltage is a low voltage and setting the boost voltage to a second voltage in response to the detection module determining that the input line voltage is a high voltage, the second voltage higher than the first voltage, the boost stage comprising a direct current ("DC") to DC switching power supply wherein the input line voltage provides input power to the boost stage and the boost voltage comprises a regulated output voltage of the boost stage;
   setting a turns ratio of a transformer to a first turns ratio in response to the determining that the input line voltage is the low voltage, wherein the transformer electrically connects a primary side of a buck-derived stage of the power supply to a secondary side of the power supply, wherein the transformer is a component of the buck-derived stage of the power supply, the boost voltage comprising an input voltage to the buck-derived stage, an output of the buck-derived stage comprising a DC output voltage of the power supply, the output voltage regulated to a voltage lower than the boost voltage; and
   setting the turns ratio of the transformer to a second turns ratio in response to determining that the input line voltage is the high voltage.

17. The method of claim 16, wherein the first turns ratio provides optimal energy transfer by the transformer from the primary side to the secondary side when the boost voltage is set to the first voltage, and the second turns ratio provides optimal energy transfer by the transformer from the primary side to the secondary side when the boost voltage is set to the second voltage.

* * * * *